T. E. MURRAY, Jr., AND J. B. MURRAY.
METHOD OF ELECTRIC WELDING AND PRODUCT THEREOF.
APPLICATION FILED NOV. 25, 1919.
1,332,563.
Patented Mar. 2, 1920.
Fig. 1.
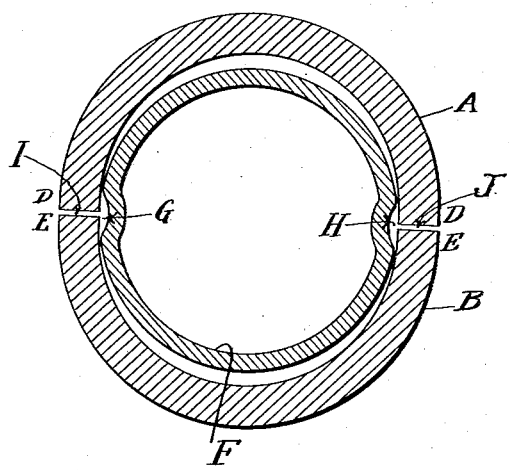
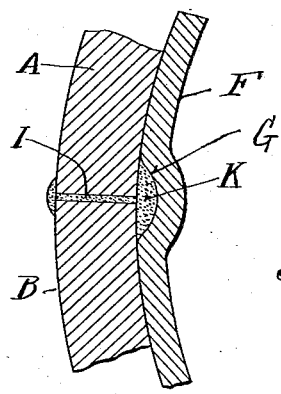
Fig. 2.
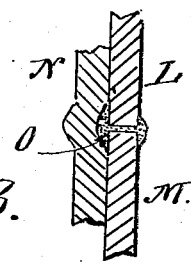
Fig. 3.
Inventors
Thomas E. Murray Jr
Joseph B. Murray
By Park Benjamin
their Attorney

UNITED STATES PATENT OFFICE.

THOMAS E. MURRAY, JR., AND JOSEPH B. MURRAY, OF BROOKLYN, NEW YORK.

METHOD OF ELECTRIC WELDING AND PRODUCT THEREOF.

1,332,563.  Specification of Letters Patent.  Patented Mar. 2, 1920.

Application filed November 25, 1919. Serial No. 340,606.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electric Welding and Products Thereof, of which the following is a specification.

In U. S. Patent No. 1,316,383, granted to us September 16, 1919, we have set forth a method of uniting a metal inner tube to a metal outer envelop inclosing the same, which consists in electrically fusing under pressure a portion of the metal of said envelop, and thereby causing said fused metal to enter the joint between the opposite surfaces of said tube and said envelop and unite said surfaces; and also the combination of a metal inner tube and a metal outer envelop inclosing the same, the opposing surfaces of said tube and said envelop being electrically welded together.

There are cases in which a positive connection between the tubes is desirable, especially where the outer envelop is fixed and a torsional strain comes on the inner tube, tending to rotate the same. One object of our present invention is to provide this positive connection.

While the welded joint in the enveloping tube made in accordance with our aforesaid method is amply strong for most purposes, there are conditions where it is important that the maximum possible strength of joint should be obtained. These conditions arise, for example, when the inner tube is thin and is subjected to high internal pressure, and which it is enabled to withstand by the reinforcement provided by the enveloping tube. In such event, if the fused metal at the joint between the sections of the enveloping tube meets the wall of the inner tube placed directly in contact with and so closing the end of the joint, the said wall tends to chill said fused metal for a short distance outwardly in the joint, and consequently over this distance the strength of the union is not as great as elsewhere. This difficulty is avoided by our present invention by reason of the recess provided in the inner tube, which recess spans the joint so that the fused metal extruded inwardly therefrom may freely flow into said recess. The chilling effect of the inner tube then expends itself on the extruded metal in the recess, and does not reach the metal at the actual joint between the welded sections.

In the accompanying drawing—

Figure 1 is a transverse section of the inner tube and envelop before welding. Fig. 2 is an enlarged section of the joint in the outer tube, and of the portion of the inner tube containing the recess into which the metal from said joint is extruded. Fig. 3 is a section of a similar joint between flat plates.

Similar letters of reference indicate like parts.

As set forth in our above-named patent, the outer inclosing tube is formed in two longitudinal half sections A, B having take-ups D, E which, when said sections A, B are welded, disappear—the metal forming them being extruded. In carrying out our present invention, we produce on the outer periphery of the inner tube F a recess G, or a plurality of recesses G, H. The recess G is then placed opposite to and spanning the joint I between the sections; or if there are two recesses G, H, as shown, then one recess G is disposed opposite to and spanning joint I, and the other, H, opposite to and spanning joint J. When the welding is done, metal K extruded at the joint, or joints, enters and fills the recess, or recesses, as shown in Fig. 2. This metal adheres to both tube and envelop, and because it enters the said recess, or recesses, and solidifies therein, it causes a positive engagement between tube and envelop, whereby any rotation of said tube in said envelop is prevented, while also uniting said tube and said envelop.

Because the recess G spans the joint—or, in other words, because the surface of said recess is everywhere distant from the inner end of the joint—it will be obvious that said end is not directly closed by contact with the wall of said inner tube. Hence when the extruded fused metal K flows freely into said recess and fills it, as already explained, the chilling effect of the inner tube is expended upon said extruded metal, and does not reach the metal in the joint I, so that the strength of the joint is thus protected from any impairment which might result from the chill extending into said joint.

While we have here described our method as adapted to a joint between tube sections, it will be obvious that it can be applied to any electrically welded joint—as, for example, one between the edges of two plates L, M, a third plate N having a recess O being secured in any suitable way on one side of said plates so as to span the joint. The extruded metal, as before, then fills the recess O, with the result of preventing chilling of the metal at the joint, already described.

We claim:

1. The combination of a metal inner tube having a recess in its outer periphery and a metal outer envelop having an electrically welded joint, the said recess being filled with metal fused at and extruded from said joint.

2. The combination of a metal inner tube having a recess in its outer periphery and a metal outer envelop formed in two longitudinal sections electrically welded together and inclosing said inner tube, the said recess spanning the joint between said sections and being filled with the fused metal extruded from said joint.

3. The combination of a metal inner tube having a plurality of recesses in its outer periphery and a metal outer envelop formed in two longitudinal sections electrically welded together and inclosing said inner tube, the said recesses spanning the joint between said sections and being filled with the fused metal extruded from said joint.

4. The method of preventing chilling of the metal at an electrically welded joint between longitudinal half sections of a metal tube enveloping an inner metal tube, which consists in forming a recess on the outer periphery of the inner tube, and placing said inner tube in said enveloping tube so that said recess shall span the inner end of said joint, and then electrically welding said sections together under pressure, whereby the fused metal extruded at the welded joint is caused to enter and fill said recess.

5. The method of preventing chilling of the metal at an electrically welded joint, which consists in forming a recess in a body of metal, placing said body against the parts to be welded so that said recess shall span one end of the joint between said parts, and then electrically welding said parts under pressure, whereby the fused metal extruded at the welded joint is caused to enter and fill said recess.

In testimony whereof we have affixed our signatures in presence of two witnesses.

THOMAS E. MURRAY, Jr.
JOSEPH B. MURRAY.

Witnesses:
GERTRUDE T. PORTER,
MAY T. McGARRY.